(12) United States Patent
Matalon et al.

(10) Patent No.: US 9,366,346 B2
(45) Date of Patent: Jun. 14, 2016

(54) VALVE HAVING AT LEAST ONE HOURGLASS STUDS FOR COUPLING TO DIAPHRAGM AND COMPRESSOR/SPINDLE COMPONENTS

(71) Applicant: ITT MANUFACTURING ENTERPRISES LLC., Wilmington (DE)

(72) Inventors: Louis E. Matalon, Lancaster, PA (US); Ronald G. Butler, Mountville, PA (US)

(73) Assignee: ITT MANUFACTURING ENTERPRISES LLC., Wilmington, DE (US)

( * ) Notice: Subject to any disclaimer, the term of this patent is extended or adjusted under 35 U.S.C. 154(b) by 162 days.

(21) Appl. No.: 14/192,981

(22) Filed: Feb. 28, 2014

(65) Prior Publication Data

US 2015/0247581 A1 Sep. 3, 2015

(51) Int. Cl.
*F16K 7/16* (2006.01)
*F16K 7/12* (2006.01)

(52) U.S. Cl.
CPC .. *F16K 7/16* (2013.01); *F16K 7/126* (2013.01)

(58) Field of Classification Search
CPC ........... F16K 7/126; F16K 7/123; F16K 7/16; A61F 13/4902; A61F 13/15707; A61F 13/15699
USPC ................................ 251/335.2, 213, 291, 331
See application file for complete search history.

(56) References Cited

U.S. PATENT DOCUMENTS

| 1,416,452 | A |   | 5/1922  | Cowey    |           |
|-----------|---|---|---------|----------|-----------|
| 1,855,991 | A |   | 4/1932  | Saunders |           |
| 2,216,292 | A | * | 10/1940 | Evleth   | F16K 7/16 |
|           |   |   |         |          | 251/265   |
| 2,540,298 | A | * | 2/1951  | Seng     | F16K 7/16 |
|           |   |   |         |          | 251/268   |
| 2,853,270 | A | * | 9/1958  | Boteler  | F16K 7/126 |
|           |   |   |         |          | 251/331   |
| 2,892,613 | A | * | 6/1959  | Boteler  | F16K 7/126 |
|           |   |   |         |          | 251/331   |
| 3,067,764 | A |   | 12/1962 | Geary    |           |
| 3,298,660 | A |   | 1/1967  | Price et al. |       |
| 3,349,795 | A | * | 10/1967 | Matsutani | F16K 7/126 |
|           |   |   |         |          | 137/375   |
| 3,577,850 | A |   | 5/1971  | Harris, Sr. |        |
| 3,631,882 | A | * | 1/1972  | White, Jr. | F16K 7/126 |
|           |   |   |         |          | 137/312   |
| 4,250,596 | A |   | 2/1981  | Hara et al. |        |

(Continued)

FOREIGN PATENT DOCUMENTS

| AU | 6520174 | | 8/1975 |             |
|----|---------|---|--------|-------------|
| CA | 2452809 | A1 * | 6/2004 | ......... F16K 7/126 |

(Continued)

OTHER PUBLICATIONS

JP61160666 English Language Abstract.

(Continued)

*Primary Examiner* — Marina Tietjen

(57) ABSTRACT

Apparatus, including or forming part of a diaphragm valve, features a diaphragm; a compressor or spindle component; and at least one hourglass-stud having a head configured to couple to the compressor or spindle component, having a lower shaft configured to couple to the diaphragm, and having an upper shaft configured to couple together the head and the lower shaft, the head having opposing curved surfaces configured and dimensioned with a width so as to be substantially the same as the diameter of the lower shaft, the upper shaft having a diameter configured and dimensioned so as to be smaller, including slightly smaller, than the width of the opposing curved surfaces of the head.

20 Claims, 11 Drawing Sheets

Associated Individual Components

(56) References Cited

U.S. PATENT DOCUMENTS

| | | | |
|---|---|---|---|
| 4,566,924 A | 1/1986 | Hara et al. | |
| 4,596,268 A * | 6/1986 | Jonas | F16K 7/126 137/375 |
| 5,002,086 A * | 3/1991 | Linder | F16K 17/0453 137/312 |
| 5,004,011 A * | 4/1991 | Linder | F16K 1/523 137/556 |
| 5,967,142 A | 10/1999 | Dorcheh et al. | |
| 6,230,609 B1 | 5/2001 | Bender et al. | |
| 7,926,785 B2 | 4/2011 | Wincek | |
| 2001/0025654 A1* | 10/2001 | Iritani | F16K 7/126 137/312 |
| 2002/0158222 A1 | 10/2002 | Johnson et al. | |
| 2004/0262562 A1 | 12/2004 | Maula et al. | |
| 2007/0120086 A1* | 5/2007 | Yoshino | F16K 7/126 251/331 |
| 2011/0031427 A1* | 2/2011 | Sitnikov | F16K 7/126 251/335.2 |
| 2011/0114868 A1 | 5/2011 | Warren et al. | |
| 2014/0021392 A1 | 1/2014 | Matalon | |

FOREIGN PATENT DOCUMENTS

| | | | |
|---|---|---|---|
| EP | 0023409 | 4/1981 | |
| FR | 918546 | 2/1947 | |
| GB | 653416 A * | 5/1951 | F16K 7/16 |
| GB | 806745 | 12/1958 | |
| GB | 901185 | 7/1962 | |
| GB | 1171498 | 11/1969 | |
| GB | EP 0023409 A1 * | 2/1981 | F16K 7/123 |
| JP | 61160666 | 7/1986 | |
| JP | WO 2005073605 A1 * | 8/2005 | F16K 7/126 |

OTHER PUBLICATIONS

FR918546 4 pages in English Thomson Innovation Record View.

* cited by examiner

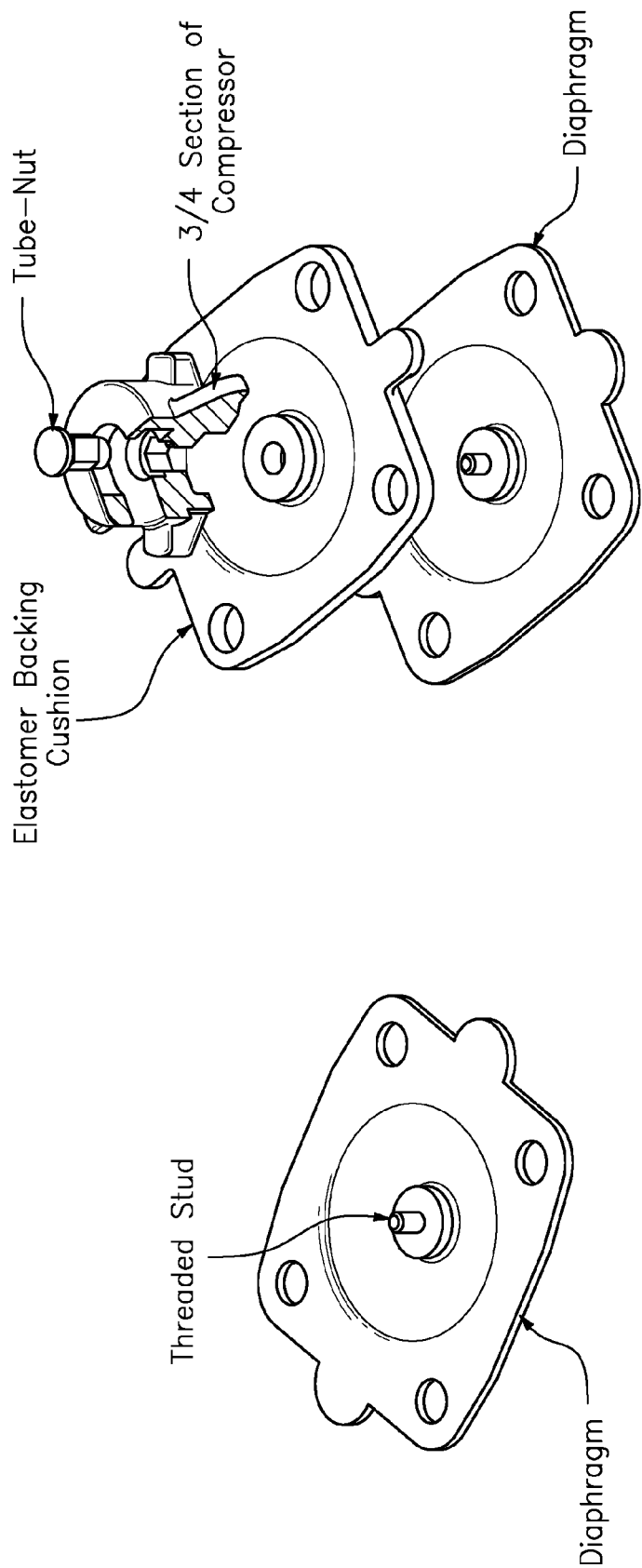
FIG. 1A: PTFE Diaphragm Containing a Threaded Stud
FIG. 1B: Associated Individual Components
FIG. 1: Typical Connection of Threaded Diaphragm Stud (PRIOR ART)

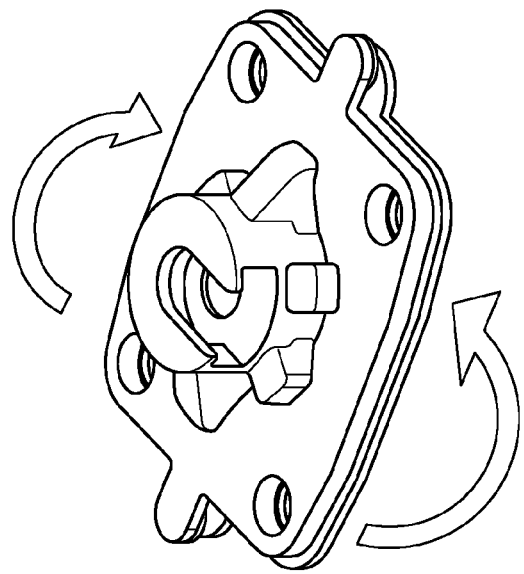
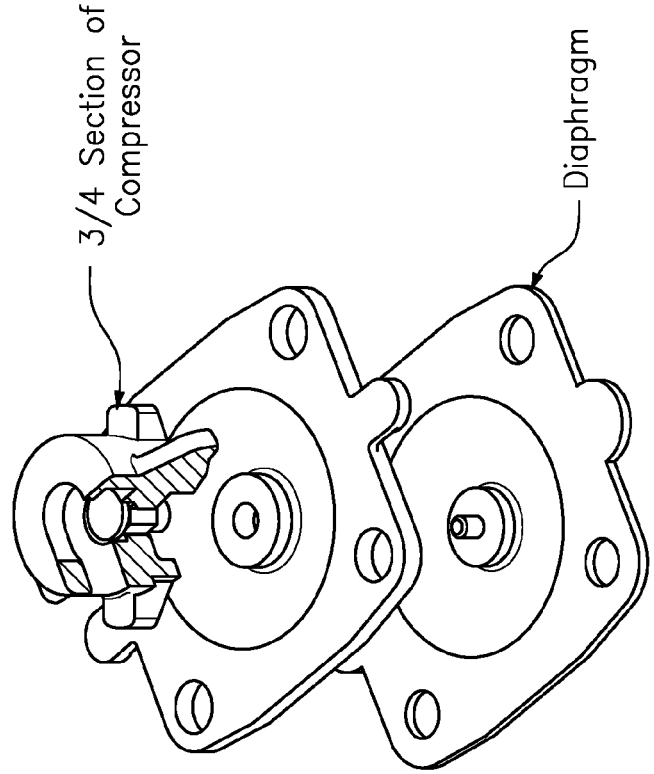
FIG. 1C: Tube-Nut Rotation Constrained with Hex Contact to Compressor
FIG. 1D: Diaphragm Stud Threaded to Tube-Nut (multiple Turns)

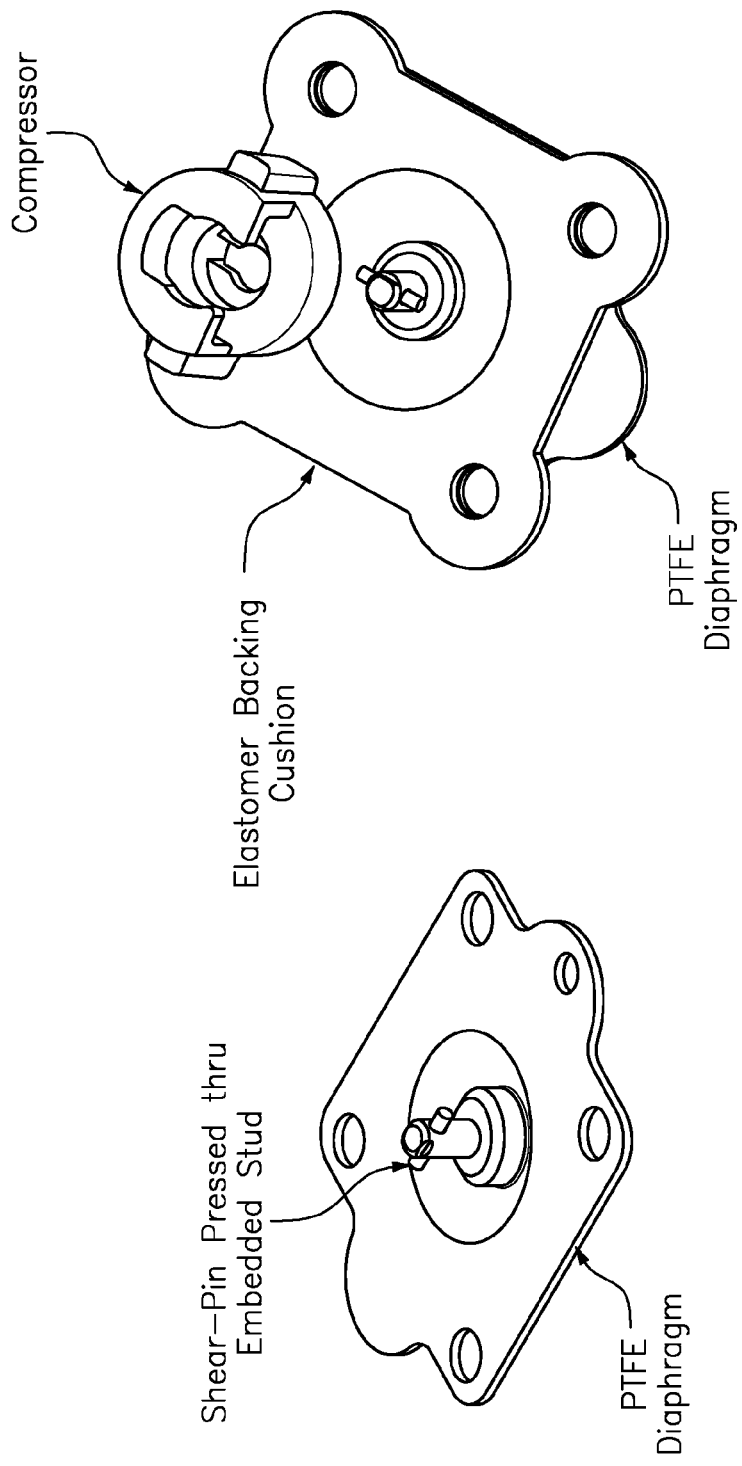
FIG. 2A: PTFE Diaphragm Containing a Stud with Pressed-In Shear-Pin   FIG. 2B: Associated Individual Components
FIG. 2: Typical Connection of Shear-Pin Diaphragm Stud
(PRIOR ART)

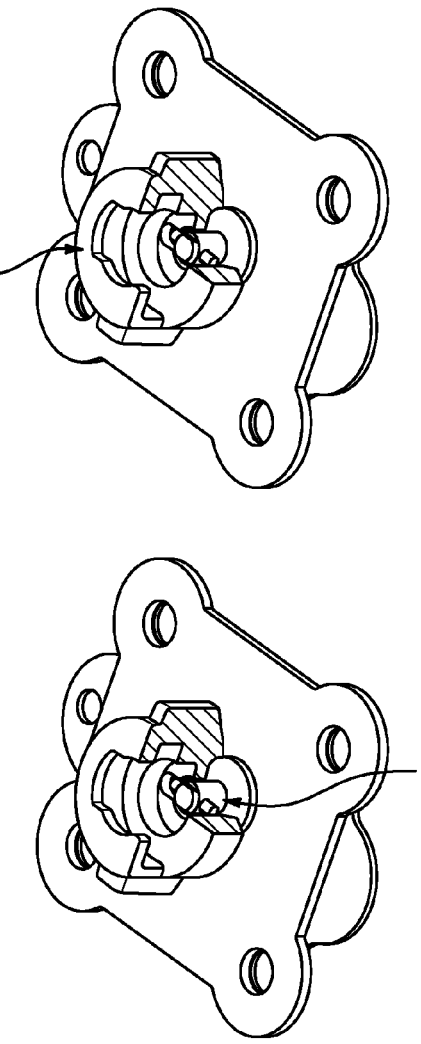

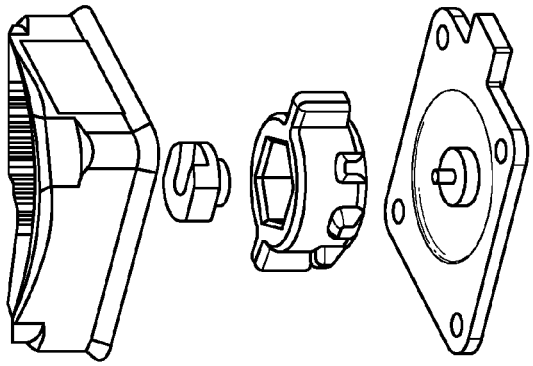
FIG. 3A: GEMU  FIG. 3B: SED  FIG. 3C: BSS
Note: For all these known configurations, the diaphragm is held in place with a threaded connection of an embedded stud
FIG. 3: Other Known Threaded Connections for Diaphragm (PRIOR ART) Attatchment using a Threaded Stud

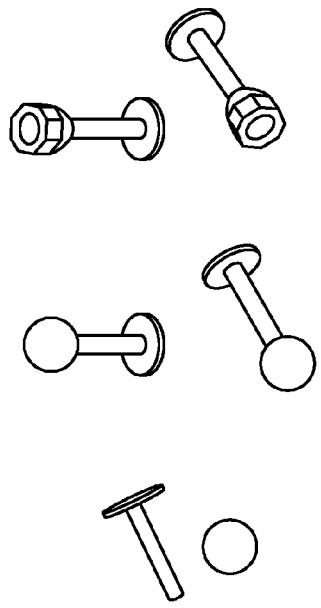
FIG. 4B: Single-Piece Thin-Shaft Stud & Two-Piece Threaded Stud
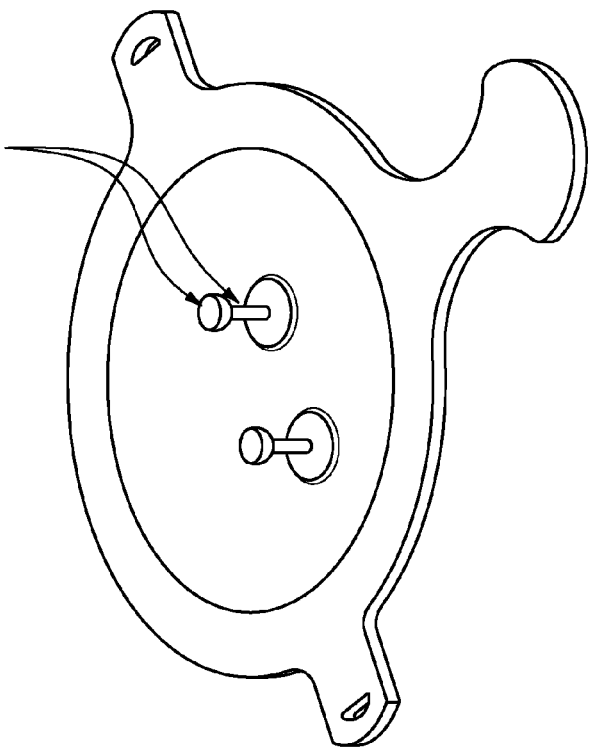
High Ratio of Head φ Vs. Shaft φ
FIG. 4A: Dual Stud Diaphragm using Single-Piece Thin-Shaft Stud (Difficult to Process)
FIG. 4: Dual Stud Connection, including Two-Part Stud Geometries (PRIOR ART) Developed for 2 Stud Diaphragms

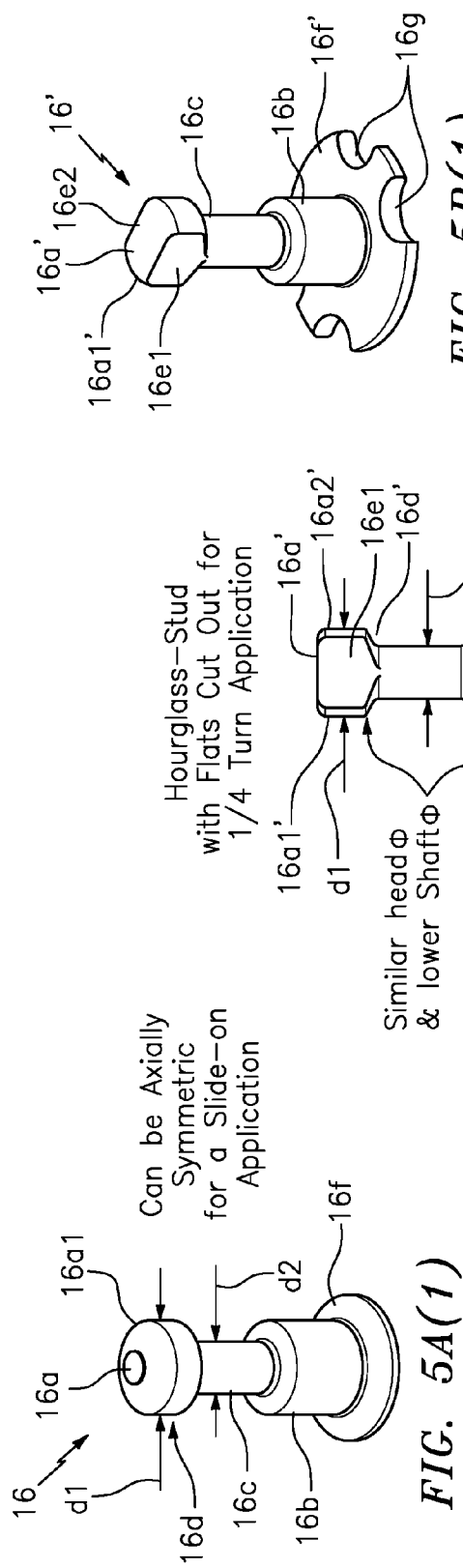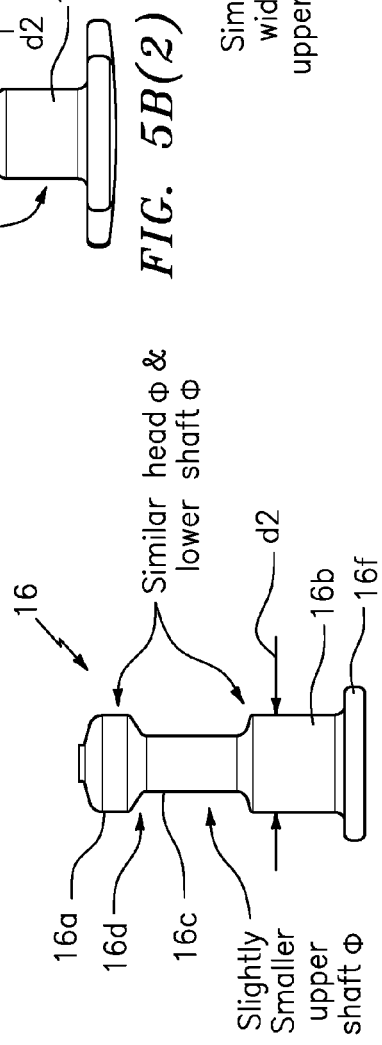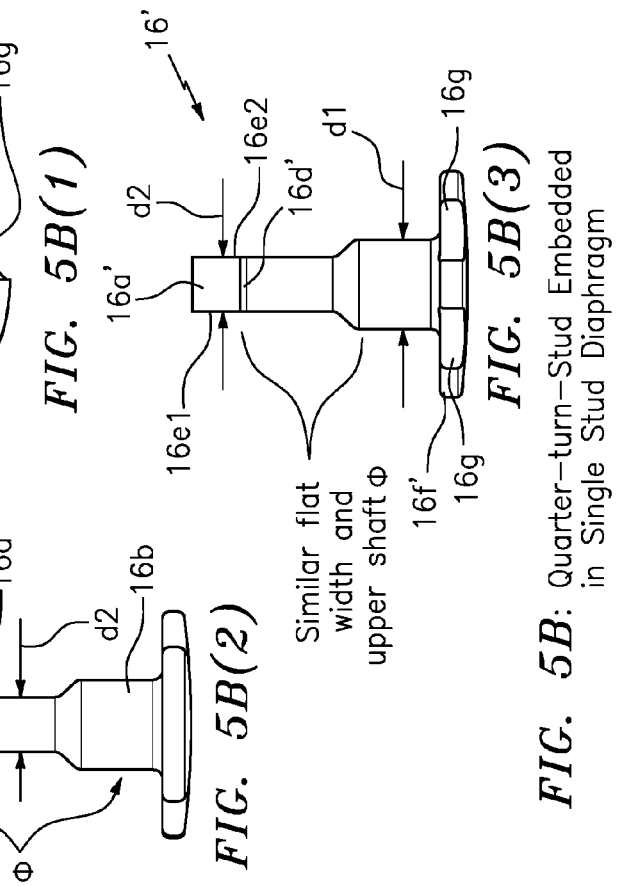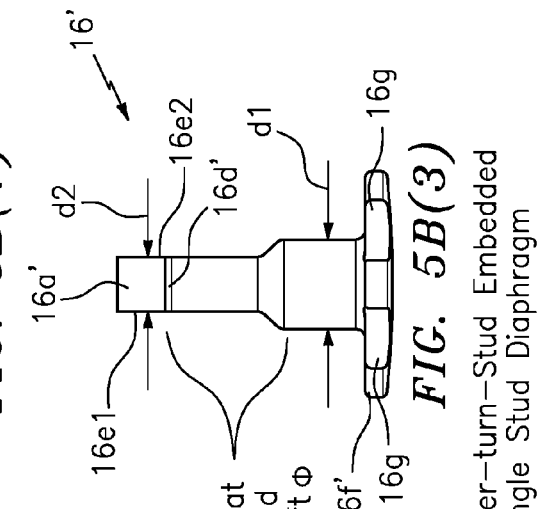
FIG. 5: Hourglass-Stud and Quarter-Turn-Stud

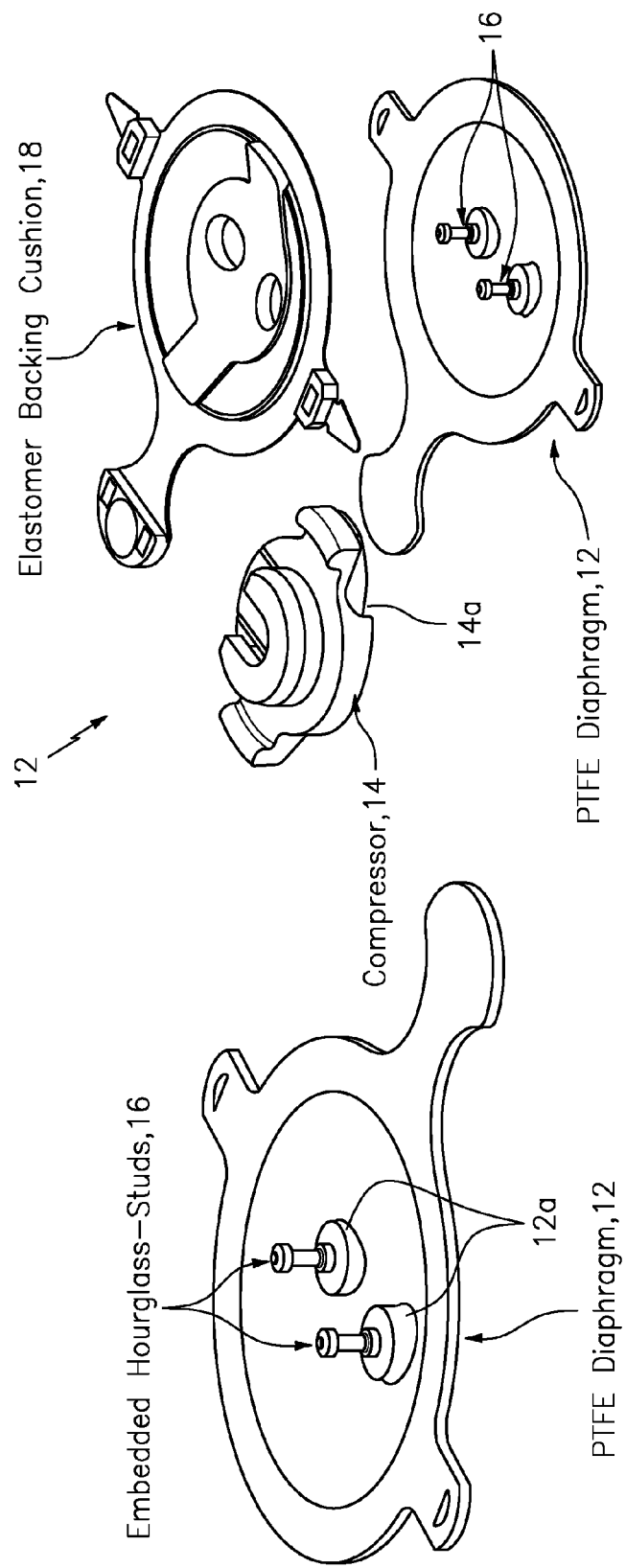
FIG. 6A: 2 Stud PTFE Diaphragm with Embedded Hourglass-Studs
FIG. 6B: Associated Individual Components
FIG. 6: Hourglass-Stud Connection

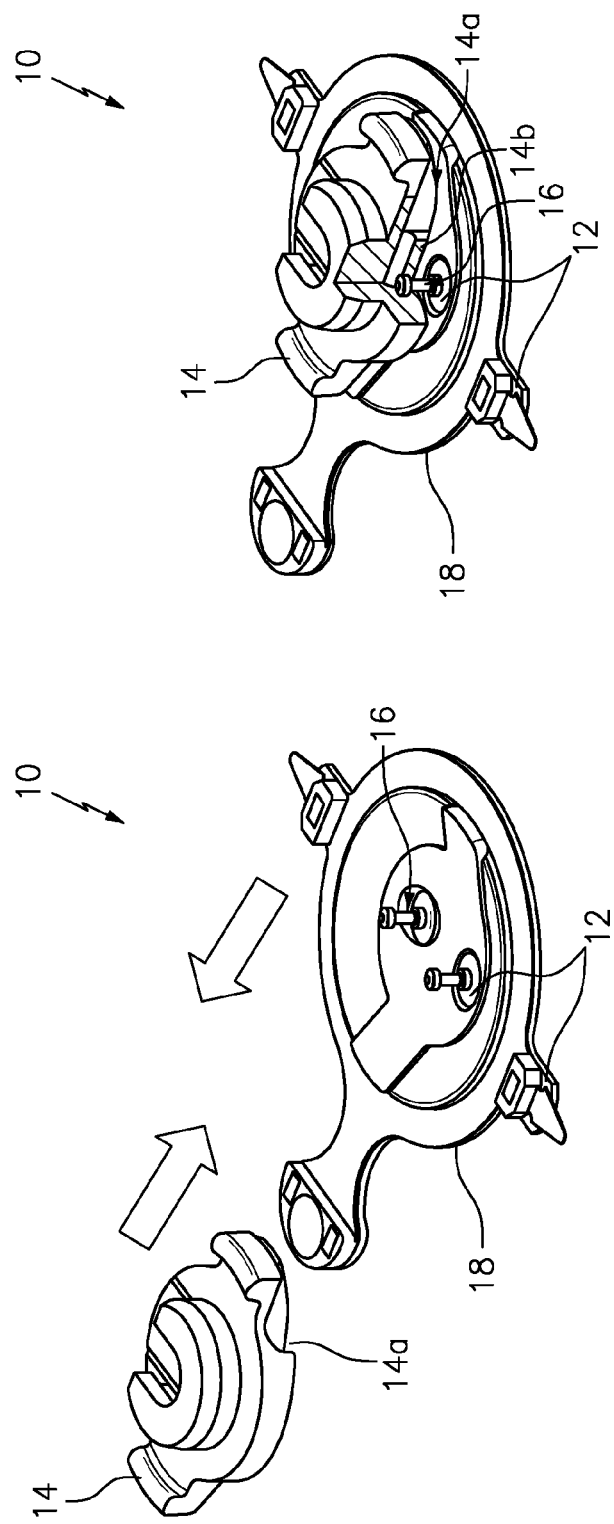
FIG. 6C: Hourglass–Stud Diaphragm/Backing Cushion Assembly Sliding onto Compressor
FIG. 6D: Cutaway Section of Compressor to Show Stud/compressor Connection

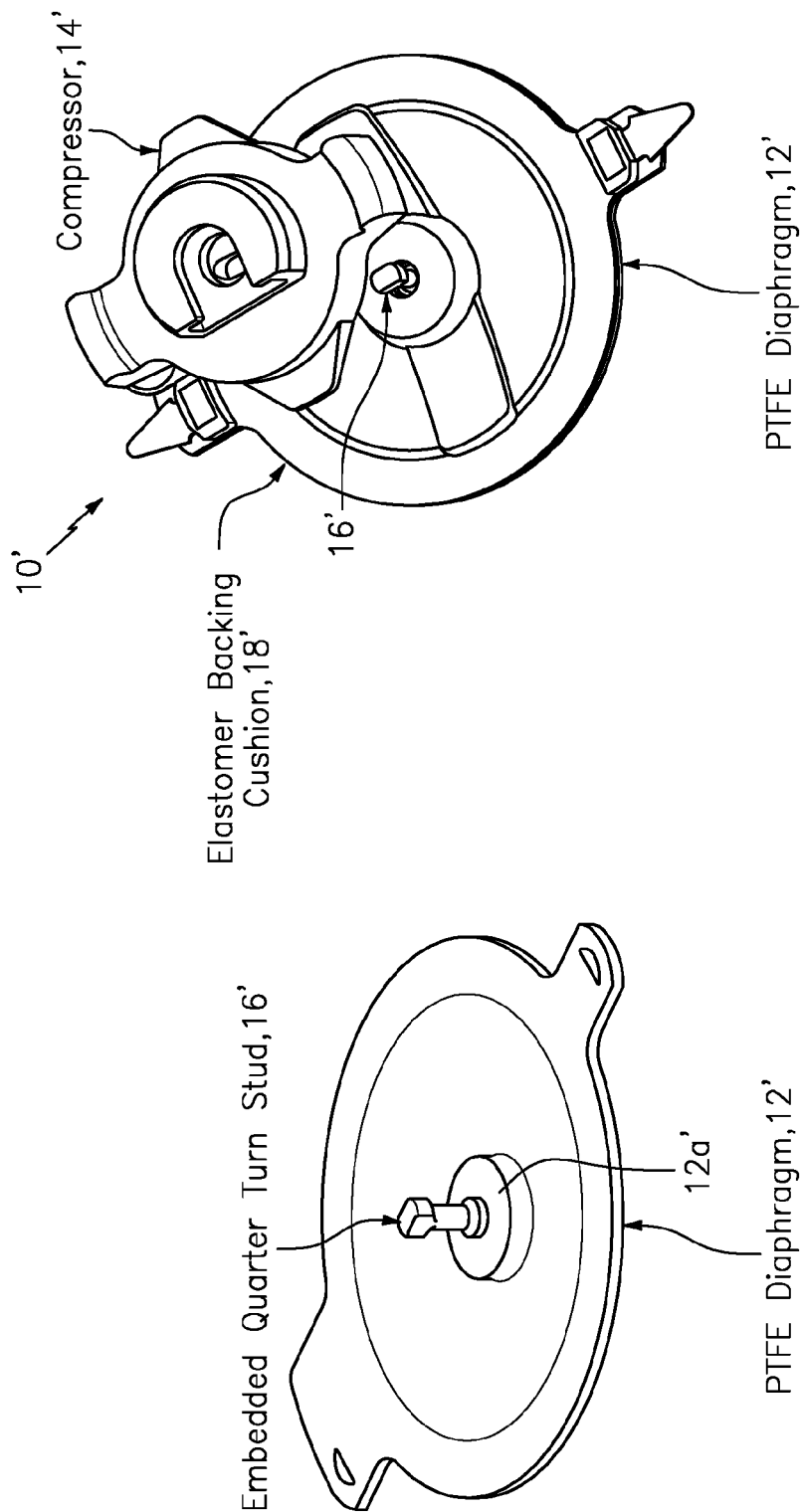
FIG. 7A: PTFE Diaphragm with Embedded Quarter Turn Stud
FIG. 7B: Associated Individual Components
FIG. 7: Quarter-Turn-Stud Connection

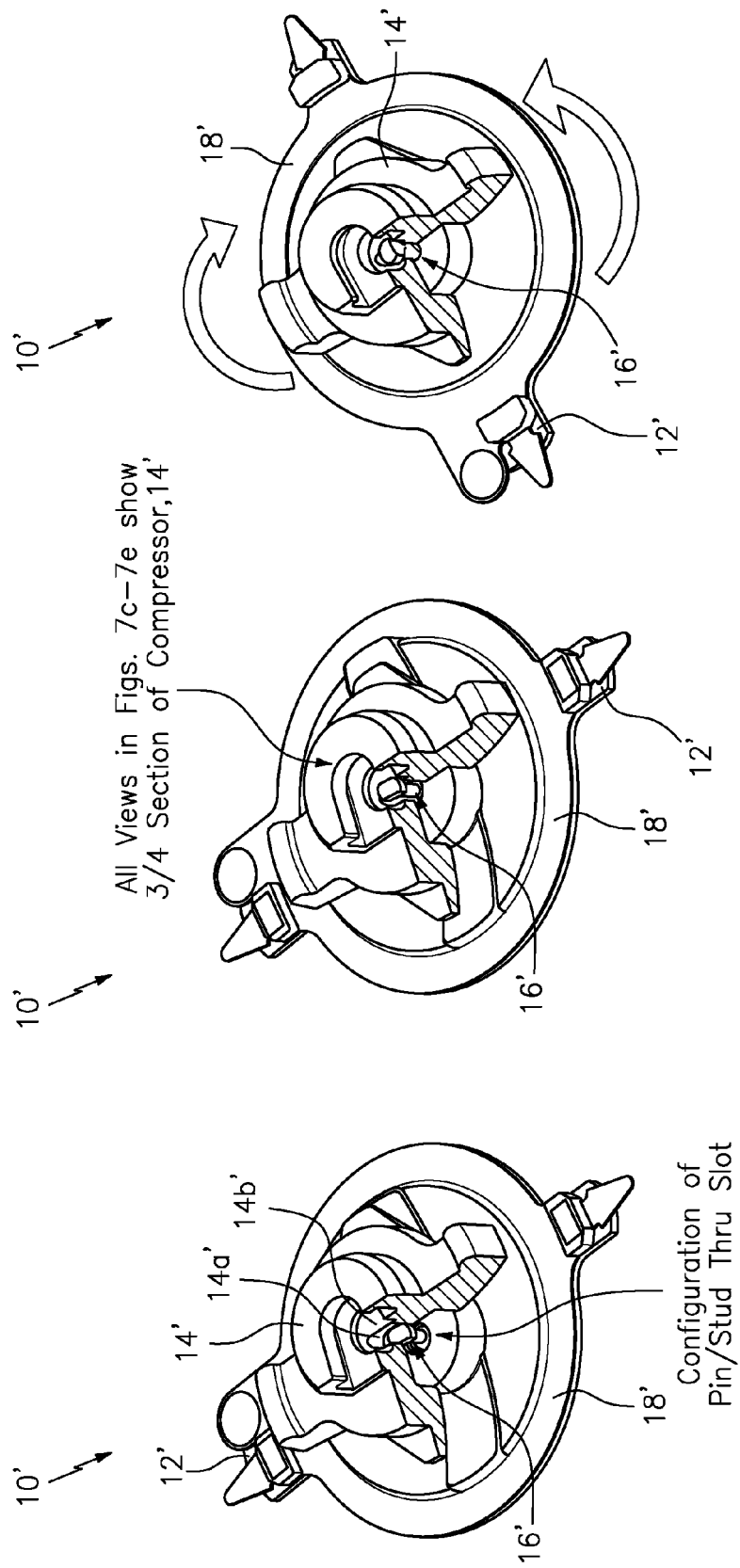
FIG. 7C: PTFE Diaphragm Quarter-Turn-Stud passing thru Compressor Slot
FIG. 7D: PTFE Diaphragm Quarter-Turn-Stud thru Compressor Slot
FIG. 7E: Fully Assembled With 90° Rotation (in either direction)

VALVE HAVING AT LEAST ONE HOURGLASS STUDS FOR COUPLING TO DIAPHRAGM AND COMPRESSOR/SPINDLE COMPONENTS

BACKGROUND OF THE INVENTION

1. Field of the Invention

The present invention relates to a diaphragm valve; and more particularly relates to a weir-type diaphragm valve.

2. Brief Description of Related Art

Diaphragms used within diaphragm valves are typically made from plastic or rubber, which is molded or pressed, with a metal stud in the center. The metal stud is used to move the diaphragm membrane against or away from a sealing wall within a diaphragm valve.

FIGS. 1A-1D

Threaded Connection

Most often the stud is threaded, and is received by a female thread attached either directly or indirectly to the to the valve spindle. See also that shown in FIGS. 3A-3C.

Some disadvantages of the threaded connection technique shown in FIGS. 1A-1D include at least the following:
1. When creating the diaphragm, the metal stud is embedded in the plastic or rubber. It is difficult to seal the threads during the high pressure processing. In some cases, a sleeve is threaded onto the stud prior to processing, and unthreaded after molding operations are complete. In other cases, the residue does pass thru the threads, and must be removed by chasing the threads with a die. Either way, additional manual labor is spent processing each diaphragm.
2. A mating female thread must exist on the valve to accept the diaphragm. This is often a separate encapsulated or pinned part, that must be constrained for rotation, but has limited freedom to travel up and down.
3. It takes multiple turns for the installation and removal of the diaphragm.
4. If the diaphragm is threaded too tightly, the center is pulled up away from the metal sealing surface, and the seal is defeated. If the threads are not fully engaged, the center of the diaphragm makes hard contact with the metal sealing surface, and sufficient sealing force is not provided to the sides of the seal, allowing for leakage across the valve seal. Worse yet, this concentrated loading can crack the diaphragm and allow fluid leakage into the bonnet.

FIGS. 2A-2E

Stud with Shear Pin

In some cases the metal stud has a cross hole perpendicular to the stud axis. A cross-pin (or shear-pin) is placed thru the hole after the diaphragm is formed. With insertion into the valve, the cross-pin passes thru a receiving slot, and engages the slot after being turned 90 degrees.

Some disadvantages of the stud with shear pin technique shown in FIGS. 2A-2E include at least the following:
1. The shear pin is an added part and process, required for each diaphragm.
2. The shear pin can become dislodged or lost.
3. The cross hole within the stud reduces the cross sectional area and creates a stress concentration, requiring a larger diameter stud for a given load and material. If improperly designed, there is a possibility of tensile failure or shear pin failure. There is a customer sensitivity to these risks.

FIGS. 4A-4B

Two Piece Threaded Stud

The assignee of the present patent application has developed a diaphragm valve implementation, e.g., having at least one two-part ball end stud which engages the compressor with a slotted attachment, consistent with that disclosed in patent application Ser. No. 13/554,535, filed 20 Jul. 2012, which is hereby incorporated by reference in its entirety. While this attachment method provides an important option for diaphragms containing 2 studs to the state of the art, based on the current understanding and development, further improvement(s) may be possible to built on this technique for such a stud, based at least partly on some now perceived disadvantages, which may include at least the following:
1. The current ratio of head diameter to shaft diameter appears to be too large for the molding process to seal the stud in a cost efficient manner, requiring that the head of the stud be a separate part, forming a so-called two-part construction (e.g., shown in FIG. 4B with a threaded connection).
2. There appears to be additional part cost and labor associated with the extra part and threaded features.
3. There appears to be unacceptable risk of the part unthreading.
4. Other attachment methods lack reliability or cost effectiveness.

The present application sets forth some important improvement(s) to the aforementioned techniques, including that in FIG. 4.

SUMMARY

The three prior art techniques are summarized as follows:
A) The threaded connection:
  1) Requires either threaded sleeve, or cleaning of the threads;
  2) Added valve part—requires a captured floating nut;
  3) Requires multiple turns for installation and removal; and
  4) Improper # of turns can cause malfunction.
B) The stud with shear-pin:
  1) Added part and assembly;
  2) Dislodge position or loss of pin; and
  3) Risk of stud tensile or shear pin failure
C) 2 piece stud:
  1) Additional part and labor;
  2) Poor reliability; and
  3) Alternate attachment methods are costly or unreliable.

SUMMARY OF THE INVENTION

According to some embodiments, the present invention may take the form of apparatus, e.g., including a valve or a diaphragm valve, featuring a combination of a diaphragm; a compressor or spindle component; and at least one hourglass-stud having a head configured to couple to the compressor or spindle component, having a lower shaft configured to couple to the diaphragm, and having an upper shaft configured to couple together the head and the lower shaft, the head having opposing curved surfaces configured and dimensioned with a width so as to be substantially the same as the diameter of the lower shaft, the upper shaft having a diameter configured and dimensioned so as to be smaller, including slightly smaller, than the width of the opposing curved surfaces of the head.

By way of example, embodiments of the present invention are disclosed herein in which the head of the hourglass-stud may include, or take the form of, either a full rounded head configuration, e.g., for embedding as part of a dual stud diaphragm implementation, or a partial flat and rounded head configuration, also known herein as a quarter-turn-hourglass-stud, for embedding as part of a single stud diaphragm implementation, consistent with that disclosed herein.

The at least one hourglass-stud may be configured as a single integral molded unit, including being formed or manufactured as a unit, part or component using a molding process.

Embodiments may include the combination configured as part of the valve or diaphragm valve, or the apparatus may take the form of the valve or diaphragm valve having the combination forming a part thereof.

Embodiments of the present invention may also include one or more of the following features:

The head and the lower shaft may be configured so that, when the at least one hourglass-stud is molded during high pressure processing, powder can be compressed and a stud seal can be maintained, e.g., including PTFE powder.

The upper shaft may be configured so that, when the at least one hourglass-stud is molded during the high pressure processing, the slightly smaller diameter of the upper shaft allows for precise height positioning of the at least one hourglass-stud.

The at least one hourglass-stud may be configured so that a diameter differential between the head and the upper shaft also provides a ledge for a simple floating connection to the compressor.

The at least one hourglass-stud may be configured to be axially symmetric for slide-on applications to the compressor or spindle component.

The head may include a curved circumferential surface, and the width of the opposing curved surfaces corresponds to the diameter of the curved circumferential surface.

The at least one hourglass-stud may include, or take the form of, two hourglass-studs, each hourglass-stud configured to couple to the diaphragm and the compressor or spindle component.

The compressor or spindle component may include two slots formed therein and configured to accept the two hourglass studs with a linear motion, perpendicular to an opening/closing motion of the diaphragm.

Each hourglass-stud may be configured with a respective ledge; and each slot may be configured with a correspond ledge to engage the ledge of the respective hourglass stud.

The at least one hourglass-stud may include a base configured to be embedded in a portion of the diaphragm.

The Quarter-Turn-Hourglass-Stud

The head may also include opposing flat surfaces cut or formed therein configured for ¼ turn applications, including for using in a single stud diaphragm implementation.

The opposing flat surfaces may be configured and dimensioned with a corresponding width that is substantially the same as the diameter of the upper shaft.

The compressor or spindle component may include a single slot formed therein and configured to allow passage of the head of a single hourglass-stud, so that a quarter turn of the diaphragm, including 90 degrees in either direction, the head of the single hourglass-stud can no longer pass back through the single slot, and a connection is made between the single hourglass-stud and the compressor or spindle component.

The single hourglass-stud may be configured with a ledge; and the single slot may be configured with a corresponding ledge to engage the ledge of the single hourglass-stud when the diaphragm is rotated with the quarter turn.

The at least one hourglass-stud may include a base with scallops formed therein and configured to be embedded in a portion of the diaphragm.

The scallops may be configured to prevent the at least one hourglass-stud from turning within the portion of the diaphragm.

Advantages

Both designs allow for limited stud float in the connection, as required for part/construction variability. Customer variation in attachment "turns" of a threaded design is eliminated.

The single piece hourglass-studs are small and strong, cost effective and easy to produce. The hourglass-studs work well in diaphragm processing, sealing the stud against the mold. The hourglass-studs provide simple and reliable valve connection without special receiving parts in the valve. The connection provides a linear "float", as required for a good fit despite part variability, and also eliminates customer attachment variability.

BRIEF DESCRIPTION OF THE DRAWING

The drawing includes the following Figures, not necessarily drawn to scale:

FIG. 1 includes FIGS. 1A to 1D and shows a typical connection of threaded diaphragm studs known in the art, where FIG. 1A shows a perspective view of a diaphragm containing a threaded stud; where FIG. 1B shows an exploded view of associated individual components, including the diaphragm in FIG. 1A, a backing cushion, a ¾ section of a compressor and a tube nut; where FIG. 1C shows an exploded view of the diaphragm, the backing cushion, the ¾ section of the compressor and the tube nut in FIG. 1B with a tube nut rotation constrained with hex contact to the compressor; and FIG. 1D shows an assembled view of the diaphragm, the backing cushion, the ¾ section of the compressor and the tube nut in FIGS. 1B and 1C with a diaphragm stud threaded to the tube nut (multiple turns).

FIG. 2 includes FIGS. 2A to 2E and shows a typical connection of a shear-pin diaphragm stud known in the art, where FIG. 2A shows a perspective view of a diaphragm containing the shear-pin diaphragm stud; where FIG. 2B shows an exploded view of associated individual components, including the diaphragm in FIG. 2A, a backing cushion and a compressor; where FIG. 2C shows a partially assembled view of the diaphragm, the backing cushion and a ¾ section of the compressor in FIG. 2B with the diaphragm shear-pin passing through a compressor slot; FIG. 2D shows a partially assembled view of the diaphragm, the backing cushion and the ¾ section of the compressor in FIGS. 2B and 2C with the diaphragm shear-pin through the compressor slot; and FIG. 2E shows an assembled view of the diaphragm, the backing cushion and the ¾ section of the compressor in FIGS. 2B, 2C and 2D with a 90° rotation (in either direction) of the diaphragm.

FIG. 3 includes FIGS. 3A to 3C and shows other known threaded connections for diaphragm attachment using a threaded stud, including the diaphragm being held in place with a threaded connection of an embedded stud, where FIG. 3A shows a ¾ cross-sectional view of a GEMU design; where FIG. 3B shows a cross-sectional view of an SED design; and where FIG. 3C shows an exploded view of a BSS design.

FIG. 4 includes FIGS. 4A to 4B and shows a dual stud connection, including stud geometries developed for 2 stud diaphragms, where FIG. 4A shows a perspective view of a dual stud diaphragm using a single-piece thin-shaft stud, and where FIG. 4B shows a photograph showing a single-piece thin-shaft studs and a two-piece threaded stud, including one having its head portion unscrewed from its shaft portion.

FIG. 5 includes FIGS. 5A and 5B and shows an hourglass-stud embedded in a dual stud diaphragm in FIG. 5A and a quarter-turn-stud embedded in a single stud diaphragm in FIG. 5B, according to some embodiments of the present invention, where FIG. 5A includes FIGS. 5A(1) and 5A(2), including where FIG. 5A(1) shows a perspective view of an hourglass-stud that can be axially symmetric for a slide-on application, and where FIG. 5A(2) shows a side view of the hourglass-stud shown in FIG. 5A(1); and where FIG. 5B includes FIGS. 5B(1), 5B(2) and 5B(3), including where FIG. 5B(1) shows a perspective view of a quarter-turn-stud with flat cuts for a ¼ turn application, where FIG. 5B(2) shows a side view of the quarter-turn-stud shown in FIG. 5B(1), and where FIG. 5B(3) shows a side view of the quarter-turn-stud in FIG. 5B(2) rotated 90° in either direction.

FIG. 6 includes FIGS. 6A to 6D and shows an hourglass-stud connection, according to some embodiments of the present invention, where FIG. 6A shows a perspective view of a 2 stud diaphragm with embedded hourglass-studs; where FIG. 6B shows an exploded view of associated individual components, including the 2 stud diaphragm in FIG. 6A, a backing cushion and a compressor; where FIG. 6C shows an unassembled view of the diaphragm, the backing cushion and the compressor in FIG. 6B with a hourglass-stud diaphragm and backing cushion assembly sliding onto the compressor; and where FIG. 6D shows an assembled view of the diaphragm, the backing cushion and a ¾ section of the compressor in FIGS. 6B and 6C with a connection between the hourglass-stud diaphragm and backing cushion assembly and the compressor.

FIG. 7 includes FIGS. 7A to 7E and shows a quarter-turn-stud connection, according to some embodiments of the present invention, where FIG. 7A shows a perspective view of a diaphragm with an embedded quarter-turn-stud; where FIG. 7B shows a partially exploded view of associated individual components, including a quarter-turn-stud diaphragm and backing cushion assembly and a compressor; where FIG. 7C shows a partially assembled view of the quarter-turn-stud diaphragm and backing cushion assembly and a ¾ section of the compressor in FIG. 7B, having the quarter-turn-stud passing through a compressor slot; where FIG. 7d shows a partially assembled view of the diaphragm, the backing cushion and the ¾ section of the compressor in FIGS. 7B and 7C, having the quarter-turn-stud through the compressor slot; and where FIG. 7E shows an assembled view of the diaphragm, the backing cushion and the ¾ section of the compressor in FIGS. 7B, 7C and 7D with a 90° rotation (in either direction) of the diaphragm.

Similar parts in the various Figures will be numbered with similar reference numerals. For the sake of not cluttering the Figures, not every part in every Figure will be numbered with a reference numeral.

In the following description of the exemplary embodiment, reference is made to the accompanying Figures in the drawing, which form a part hereof, and in which are shown by way of illustration of an embodiment in which the invention may be practiced. It is to be understood that other embodiments may be utilized, as structural and operational changes may be made without departing from the scope of the present invention.

DETAILED DESCRIPTION OF THE INVENTION

Consistent with that shown in FIGS. 5-7, the present invention may take the form of apparatus generally indicated as 10, 10' featuring a combination of a diaphragm 12, 12'; a compressor or spindle component 14, 14'; and at least one hourglass-stud 16, 16' having a head 16a, 16a' configured to couple to the compressor or spindle component 14, 14', having a lower shaft 16b configured to couple to the diaphragm 12, 12', and having an upper shaft 16c configured to couple together the head 16a, 16a' and the lower shaft 16b. The head 16a, 16a' may include opposing curved surfaces 16a1, 16a1', 16a2' configured dimensioned with a width d1 so as to be substantially the same as the diameter d1 of the lower shaft 16b. The upper shaft 16c has a diameter d2 configured and dimensioned so as to be smaller, including slightly smaller, than the width d1 of the opposing curved surfaces 16a1, 16a1', 16a2' of the head 16a, 16a'.

In the embodiment disclosed in relation to FIGS. 5A and 6, the head 16a may include a curved circumferential surface 16a1, the opposing curved surfaces are understood to form diametrically opposed portions of the curved circumferential surface 16a1, and the width d1 of the opposing curved surfaces corresponds to the diameter of the curved circumferential surface 16a1, as shown and indicated in FIG. 5A, e.g., including for using in a dual hourglass-stud diaphragm implementation.

In comparison, in the embodiment disclosed in relation to FIGS. 5B and 7, the head 16a' may include opposing curved surfaces 16a1', 16a2' in combination with opposing flat surfaces 16e1, 16e2 cut or formed therein with a smaller width d2 configured for ¼ turn applications, e.g., including for using in a single hourglass-stud diaphragm implementation. In this embodiment, the diameter of the upper shaft 16b is substantially similar to the smaller width d2 of the opposing flat surfaces 16e1, 16e2, e.g., as shown and indicated in FIG. 5B.

The term "slightly smaller" is understood to mean a dimension that is sufficient enough so as to form ledges 16d and 16d', consistent with that set forth herein, e.g., in order to configure and make operational the single and/or dual hourglass-stud diaphragm implementations, consistent with that which would be understood and appreciated by one skilled in the art, and also consistent with that shown and described in the present patent application. In other words, the scope of the invention is not intended to be limited to any particular physical dimension, but instead is intended to include any dimensional relationship between the head 16a, 16a' and the upper shaft 16c sufficient enough so as to form the ledges 16d and 16d' in order to configure and make operational the single and/or dual hourglass-stud diaphragm implementations.

FIGS. 5A and 6

The Hourglass-Stud and Connection

FIG. 5A shows a first version or embodiment of the hourglass-stud 16, which is a simple, axially symmetric, screw machine part that is easily processed during diaphragm production. Because the head 16a has substantially the same diameter as the lower shaft 16b (e.g., as indicated by the dual arrows on the right side of FIG. 5A(2)), the mold can compress powder, e.g., including PTFE powder, and maintain the stud seal during high pressure processing. The slightly smaller upper shaft diameter as shown (e.g., as indicated by the single arrow on the left side of FIG. 5A(2)) allows for precise height positioning of the hourglass-stud 16 during this process. The diameter differential between the head 16a and the upper shaft 16c also provides a ledge 16d for a simple floating connection to the compressor or spindle component 14 of the valve 10. This is the type stud, e.g., which may be used in, or in conjunction with, a so-called two stud diaphragm implementation.

FIGS. 6A-6D depict the ease and reliability of the diaphragm connection to the valve. Two slots, one of which is shown and indicated by reference numeral 14a in FIGS. 6C and 6D, in the cast compressor 14 accept the two hourglass-studs 16 with a linear motion, perpendicular to the diaphragm opening/closing motion. The diaphragm 12 is restricted from moving off the slots 14a by the valve construction. When the valve is taken apart for service, the diaphragm 12 may be easily pulled off the assembly.

The scope of the invention is intended to include embodiments in which this hourglass-stud design in FIG. 5A is being used on a single stud diaphragm that engages a single slot compressor.

Each hourglass-stud 16 may be configured with a respective ledge 16d; and each slot 14a may be configured with a correspond ledge 14b to engage the ledge 14d of the hourglass stud 16a, consistent with that shown in FIG. 6D.

The at least one hourglass-stud may include a base 16f (FIG. 5A) configured to be embedded in a portion 12a of the diaphragm 12, e.g., consistent with that shown in FIG. 6A.

The associated individual components of the assembly may include a backing cushion 18, which may be elastomeric, consistent with that shown in FIGS. 6B to 6D.

FIGS. 5B and 7

The Quarter-Turn-Stud and Connection

FIG. 5B shows a second version or embodiment of the hourglass-stud that has the same basic geometry as the first version in FIG. 5A, but with flats or flat surfaces 16e1, 16e2 cut into the head 16a' of the hourglass-stud 16', and scallops 16g configured or formed in the base 16f'. This hourglass-stud 16' has all of the processing advantages as the first version in FIG. 5A, with possibly slightly higher cost to make the added features, e.g., including possibly a slightly more complicated mold configuration. The slightly smaller upper shaft diameter of the upper shaft 16c allows for precise height positioning of the hourglass-stud 16' during this process. The diameter differential between the head 16a' and the upper shaft 16c also provides the ledge 16d' for a simple floating connection to the valve. This hourglass-stud 16' may be designed for use in single stud diaphragms, consistent with that shown in FIGS. 7A to 7E.

FIGS. 7A-7E depict the ease and reliability of the diaphragm connection to the valve. The method of making the connection is very much like the shear pin stud shown in FIG. 2, without the associated cost and risks. A single slot 14a' in the valve (e.g., in the compressor or spindle component 14' as shown in FIGS. 7B to 7E) allows passage of the stud head 16a'. With a quarter turn of the diaphragm 12', e.g., 90 degrees in either direction, the head 16a' of the hourglass-stud 16' can no longer pass back through the slot 14a', and the connection is made. The single slot 14a' may be configured with a corresponding ledge 14b' to engage the ledge 14d' of the single hourglass-stud 16' when the diaphragm 12' is rotated with the quarter turn. The diaphragm 12' is restricted from rotating back, e.g., by constraints made with the final valve assembly. When the valve is taken apart for service, the diaphragm 12' may be easily rotated 90 degrees for removal. The scallops 16g are configured to prevent the hourglass-stud 16' from turning within the diaphragm 12'.

The associated individual components of the assembly may include a backing cushion 18', which may be elastomeric, consistent with that shown in FIGS. 7B to 7E.

RELATED APPLICATIONS

By way of example, the reader is referred to related patent applications as follows:

patent application Ser. No. 13/554,532, filed 20 Jul. 2012;
patent application Ser. No. 13/554,535, filed 20 Jul. 2012;
patent application Ser. No. 13/544,541, filed 20 Jul. 2012;
patent application Ser. No. 13/595,652, filed 27 Aug. 2012;
patent application Ser. No. 13/599,237, filed 30 Aug. 2012;
patent application Ser. No. 14/032,822, filed 20 Sep. 2013;

which are all assigned to the assignee of the present invention, which disclose the functionality of other parts and components that form part of diaphragm valves, and which are all incorporated by reference in their entirety.

THE SCOPE OF THE INVENTION

It should be understood that, unless stated otherwise herein, any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein and thereto without departing from the spirit and scope of the present invention.

What we claim is:

1. An apparatus, including a valve or a diaphragm valve, comprising:

a diaphragm having a diaphragm portion;
a compressor or spindle component configured with a compressor or spindle ledge; and
at least one hourglass-stud having a head configured with a ledge to engage the compressor or spindle ledge of the compressor or spindle component with a simple floating connection, having a lower shaft configured to couple to the diaphragm portion of the diaphragm, and having an upper shaft configured to couple together the head and the lower shaft, the head and the upper shaft having a diameter differential configured and dimensioned so as to form the ledge of the head to engage the compressor or spindle ledge of the compressor or spindle component with the simple floating connection, either by sliding the at least one hourglass-stud into at least one corresponding slot of the compressor or spindle component, or by passing the head of the at least one hourglass-stud through an associated slot of the compressor or spindle component and rotating the diaphragm a ¼ turn, the simple floating connection coupling together the diaphragm and compressor or spindle component and eliminating customer variations in attachment "turns" associated with a threaded design.

2. An apparatus according to claim 1, wherein the head and the lower shaft are configured so that, when the at least one hourglass-stud is molded during high pressure processing, powder is compressed and a stud seal is maintained, including where the powder is PTFE powder.

3. An apparatus according to claim 1, wherein the upper shaft is configured so that, when the at least one hourglass-stud is molded during high pressure processing, a slightly smaller diameter of the upper shaft allows for precise height positioning of the at least one hourglass-stud.

4. An apparatus according to claim 1, wherein
the head has opposing curved surfaces configured and dimensioned with a width so as to be substantially the same as the diameter of the lower shaft; and
the upper shaft has a diameter configured and dimensioned so as to be smaller, than the width of the opposing curved surfaces of the head to form the ledge for the simple floating connection with the compressor or spindle ledge of the compressor or spindle component.

5. An apparatus according to claim 1, wherein the head of the at least one hourglass-stud is configured to be axially symmetric for slide-on applications to the compressor or spindle component.

6. An apparatus according to claim 1, wherein the at least one hourglass-stud is configured as a single integral unit formed or manufactured as a single integral molded unit using a molding process.

7. An apparatus according to claim 4, wherein the head comprises a curved circumferential surface, and the width of the opposing curved surfaces corresponds to the diameter of the curved circumferential surface.

8. An apparatus according to claim 1, wherein the at least one hourglass-stud comprises two hourglass-studs, each hourglass-stud is configured to couple to the diaphragm and the compressor or spindle component.

9. An apparatus according to claim 8, wherein the compressor or spindle component includes two slots formed therein and configured to accept the two hourglass studs with a linear motion, perpendicular to an opening/closing motion of the diaphragm.

10. An apparatus according to claim 9, wherein
each hourglass-stud is configured with a respective ledge; and
each slot is configured with a corresponding ledge to engage the respective ledge of the respective hourglass stud for providing a respective simple floating connection between each of the two hourglass-studs and the compressor or spindle component.

11. An apparatus according to claim 1, wherein the at least one hourglass-stud comprises a base configured to be embedded in the diaphragm portion of the diaphragm.

12. An apparatus according to claim 1, wherein the opposing flat surfaces cut or formed therein are configured for ¼ turn applications.

13. An apparatus according to claim 12, wherein the opposing flat surfaces are configured and dimensioned with a corresponding width that is substantially the same as the diameter of the upper shaft.

14. An apparatus according to claim 11, wherein the compressor or spindle component comprises a single slot formed therein and configured to allow passage of the head of a single hourglass-stud, so that a quarter turn of the diaphragm in either rotational direction, the head of the single hourglass-stud can no longer pass through the single slot, and the simple floating connection is made between the single hourglass-stud and the compressor or spindle component.

15. An apparatus according to claim 14, wherein
the single slot is configured with the compressor or spindle ledge to engage the ledge of the single hourglass-stud when the diaphragm is rotated with the quarter turn.

16. An apparatus according to claim 1, wherein the at least one hourglass-stud comprises a base with scallops formed therein and configured to be embedded in the diaphragm portion of the diaphragm.

17. An apparatus according to claim 16, wherein the scallops are configured to prevent the at least one hourglass-stud from turning within the diaphragm portion of the diaphragm.

18. An apparatus according to claim 1, wherein the apparatus includes, or forms part of, the valve or diaphragm valve.

19. A valve or a diaphragm valve, comprising:
a diaphragm having two diaphragm portions;
a compressor or spindle component having two slots, each slot configured with a respective compressor or spindle ledge; and
two hourglass-studs, each hourglass-stud configured as a single piece with a molded construction, each hourglass-stud having a respective head, a respective lower shaft and a respective upper shaft in between, each lower shaft configured to couple to a respective one of the two diaphragm portions of the diaphragm, each upper shaft configured to couple together the respective head and the respective lower shaft of the respective head, each head and each upper shaft having a respective diameter differential configured and dimensioned so as to form a respective ledge of the respective head, each head configured to slide into a respective slot of the compressor or spindle component so each respective ledge engages a corresponding respective compressor or spindle ledge of the compressor or spindle component with a respective simple floating connection, the simple floating connection coupling together the diaphragm and compressor or spindle component and eliminating customer variations in attachment "turns" associated with a threaded design.

20. An apparatus, including a valve or a diaphragm valve, comprising:
a diaphragm having a diaphragm portion;
a compressor or spindle component configured with a slot having a compressor or spindle ledge formed therein; and
an hourglass-stud being configured as a single piece with a molded construction having a head, a lower shaft and an upper shaft in between, the lower shaft configured to couple to the diaphragm portion of the diaphragm, the upper shaft configured to couple together the head and the lower shaft, the head and the upper shaft having a diameter differential configured and dimensioned so as to form the ledge of the head, the head of the hourglass-stud configured to pass axially through the slot of the compressor or spindle component so the ledge of the head engages the compressor or spindle ledge of the compressor or spindle component with a simple floating connection when the diaphragm is rotated a ¼ turn, the simple floating connection coupling together the diaphragm and compressor or spindle component and eliminating customer variations in attachment "turns" associated with a threaded design.

* * * * *